United States Patent [19]
Beadles et al.

[11] Patent Number: 5,374,985
[45] Date of Patent: Dec. 20, 1994

[54] METHOD AND APPARATUS FOR MEASURING RANGE BY USE OF MULTIPLE RANGE BASELINES

[75] Inventors: Robert L. Beadles; Henry A. Greene, both of Durham; Jaroslaw Pekar, Chapel Hill, all of N.C.

[73] Assignee: Ocutech, Inc., Chapel Hill, N.C.

[21] Appl. No.: 815,770

[22] Filed: Jan. 2, 1992

[51] Int. Cl.$^5$ ............................................... G01C 3/08
[52] U.S. Cl. ................................................ 356/1
[58] Field of Search ............................ 356/1, 403, 4

[56] References Cited

U.S. PATENT DOCUMENTS

| | | | |
|---|---|---|---|
| 4,582,424 | 4/1986 | Kawabata | 356/1 |
| 4,963,017 | 10/1990 | Schneiter et al. | 356/1 |
| 4,970,384 | 11/1990 | Kambe et al. | 356/1 X |
| 5,000,564 | 3/1991 | Ake | 356/1 |

Primary Examiner—Mark Hellner

[57] ABSTRACT

The present invention relates to a method and apparatus for extending the range and accuracy of electronic and electro-optical systems for determining the distance from a reference object to another object. A multiplicity of range baselines is employed, and a computer, usually a microprocessor, is used to automatically switch between baselines to extend the total measurement range, to increase the precision of range measurement over a prespecified set of ranges, or both. The invention has applications in a wide variety of range measuring systems, including robotics, autofocus cameras, autofocus binoculars, and autofocus vision aids for people with impaired vision.

6 Claims, 2 Drawing Sheets

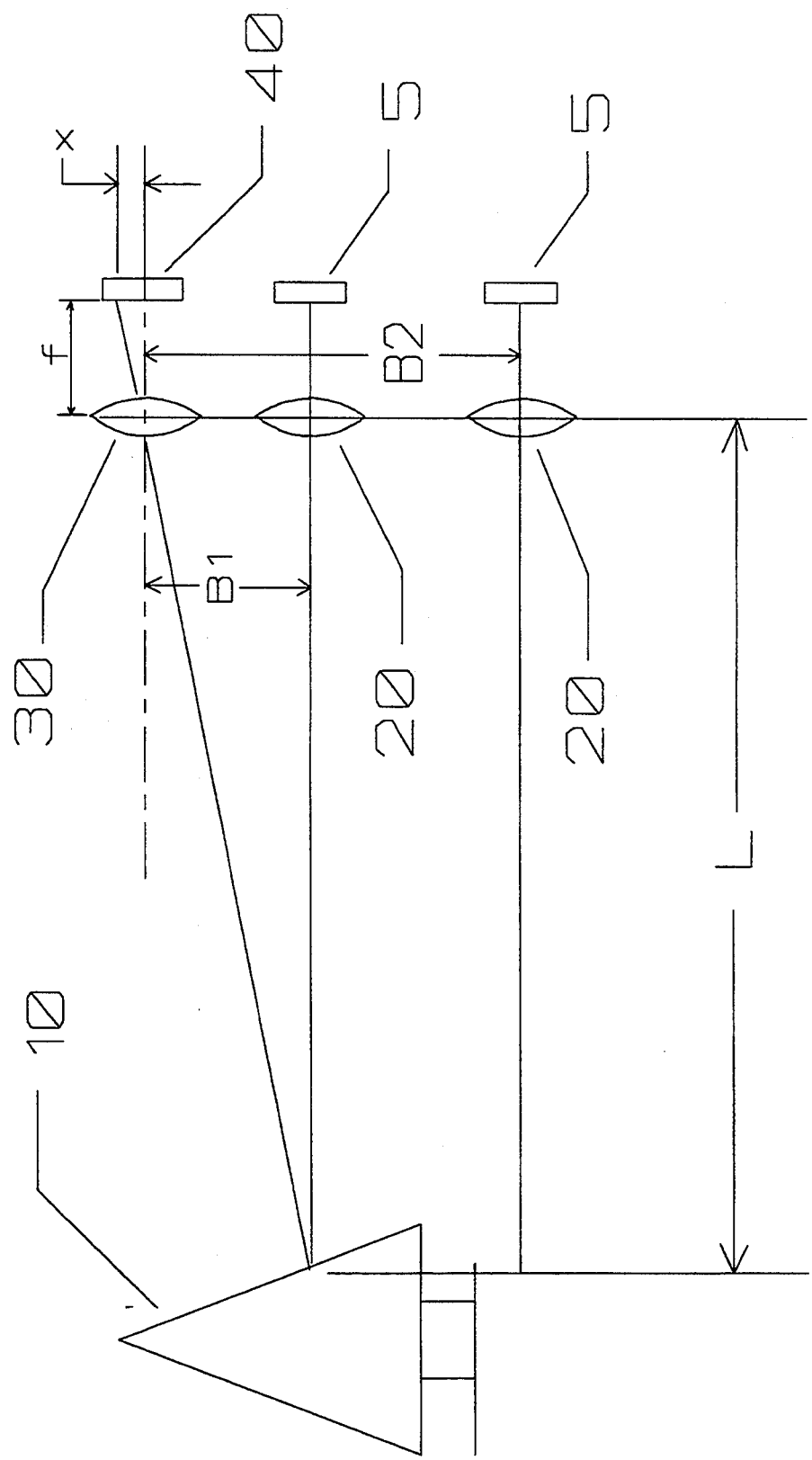

METHOD AND APPARATUS FOR MEASURING RANGE BY USE OF MULTIPLE RANGE BASELINES

BACKGROUND OF THE INVENTION

The present invention relates to a method and apparatus for extending the range and accuracy of electronic and electro-optical systems for determining the distance from a reference object to another object. A multiplicity of range baselines is employed, and a computer is used to automatically switch between base lines to extend the total measurement range, to increase the precision of range measurement over a prespecified set of ranges, or both.

Electronic systems which accurately measure the distance between a reference point and a distant object are of great value for a variety of purposes and in a broad range of applications, one of the most common being autofocus cameras. To measure range, various systems have been developed which are based on a variety of physical principles and which are successful in varying degrees for various purposes. For use in air, sonar ranging systems exist which emit an ultrasonic beam and measure its round trip time to the object of interest. Given the known speed of sound in air, the round trip time contains the information necessary to allow the calculation of the distance between ultrasound source and the object of interest. Ultrasonic systems have been successfully used in autofocus cameras and in portable aids to measure the distance to an obstacle for visually impaired people. A substantial disadvantage for some applications, and an advantage for others, is that the ultrasonic beam is reflected by some transparent objects and thus cannot measure the distance when, e.g., a glass window is interposed between the sound source and the object of interest.

At least two other types of autofocus/range-measuring systems are used in cameras. One employs passive sensors (typically charge-coupled-devices —CCDs), while the other is based on the principal of triangulation and utilizes a collimated beam of light, usually infrared (IR) light. The IR system is very widely used in autofocus cameras, particularly in relatively low-cost units. Not without its disadvantages, the IR system has received the benefit of considerable development over the last decade, and such systems are now commercially available which are capable of accurately measuring the distance between IR source (for camera or other range-measuring application) and object of interest, even in the presence of competing signals such as fluorescent or incandescent lights or the infrared component of sunlight. A representative high-quality IR system is described in 16-*STEP RANGE-FINDER IC H*2476-01, Hamamatsu Corporation, 360 Foothill Road, Bridgewater, N.J., 08807-0910, incorporated herein by reference. The reference IR system can accurately divide the distance between IR source and object into 16 "focus zones", where each of the focus zones is sufficiently well determined that the zone signal can be used to accurately focus the lens of a camera over all distances from about one meter to infinity. By employing a different optical design optimized for measuring small distances, the same electronic system can be used to accurately measure very small differences in distance, down to small fractions of a millimeter. Proximity gauges based on the IR system are one example of applications for this close-measuring capability. No single, integrated system is available or has been described, however, which can accurately measure small distances representative of those of a proximity gauge ranging up through the distances representative of close-up photography (a few millimeters up to a maximum distance of about 1 meter) and continuing to and including those distances representative of conventional photography (typically 1 meter to infinity).

Many inventions have been described for automatically measuring range. In Stimson, U.S. Pat. No. 3,435,744, an automatic focusing system is disclosed for a camera which utilizes an emitting beam and a receiving photocell. A lens which is mounted on a reciprocating mechanism and aligned with the photocell is moved so as to obtain the maximum intensity of reflected light. A distance measurement is computed according to the lens position at which the reflected light is greatest. Pagel, U.S. Pat. No. 3,442,193, discloses an improvement to Stimson which provides a means to actuate the rangefinder with a camera trigger and open the camera shutter after focus is obtained.

Larks, U.S. Pat. No. 3,511,156, teaches a method for splitting an image and comparing the position of each portion. If the portions coincide, the image is in focus, if not, correction is made.

Frazee, et al., U.S. Pat. No. 3,751,154, uses a pair of photodetectors which are moved side to side to determine object distance. The circuitry compares the signal from the two photodetectors to obtain equal signals from each. The angular position at which the signal from the two detectors is equal is used for a triangulation computation of the focal distance.

Tamura, U.S. Pat. No. 4,44,477, discloses a method of comparing the amplitude of reflected light with a reference amount. The differences may be positive or negative and relate to the distance zone of the object to be photographed.

Takagi, et al., U.S. Pat. No. 4,482,234, teaches an apparatus and method for rapidly focusing a camera wherein the full range of focus distance is divided into several ranges. The camera operator selects one of the ranges with a selector switch. The circuitry of the camera then checks the distance and adjusts the lens within the selected range.

Kawabata, U.S. Pat. No. 4,582,424, discloses a system in which a series of light sources and a series of light detectors are coupled through analytic circuitry to obtain distance measurement. By the combination of source transmissions and detector receptions, the distance by zone is determined.

Matsuda et al., U.S. Pat. No. 4,768,053, teaches an apparatus and method of measuring distance through the use of a number of light sensitive diodes positioned selectively. According to the different quantities of light on each diode, the distance to an object can be calculated by triangulation.

Ishiguro, U.S. Pat. No. 4,814,810, discloses an apparatus incorporating a light source and a plurality of light detectors. The position of reflected light on the light detectors is accurately related to the distance of the object.

None of the cited inventions or other known prior art employ or suggest the employment of the apparatus and method of the subject invention, namely, the use of multiple sets of focus zones designed into hardware and programmed to switch automatically via computer control between focus zone sets to extend the range measurement capability to accurately measure object distances from very small to very large.

SUMMARY OF THE INVENTION

The invention is a range measuring system employing infrared components or other components which use similar triangulation measurement principles. The invention basically is this:

Under the control of a computer (usually a microcontroller or microprocessor-based system), the range-measuring system is switched between two or more optical designs each of which is optimized for making range measurements over a specific range. The system typically is designed to overlap its measurement ranges so that there are no range dead bands at any distance of interest.

BRIEF DESCRIPTION OF THE DRAWINGS

FIG. I shows schematically the configuration of a single baseline range measuring system.

FIG. 2 shows similarly a two baseline system.

DETAILED DESCRIPTION OF THE PREFERRED EMBODIMENTS

Figure 1:
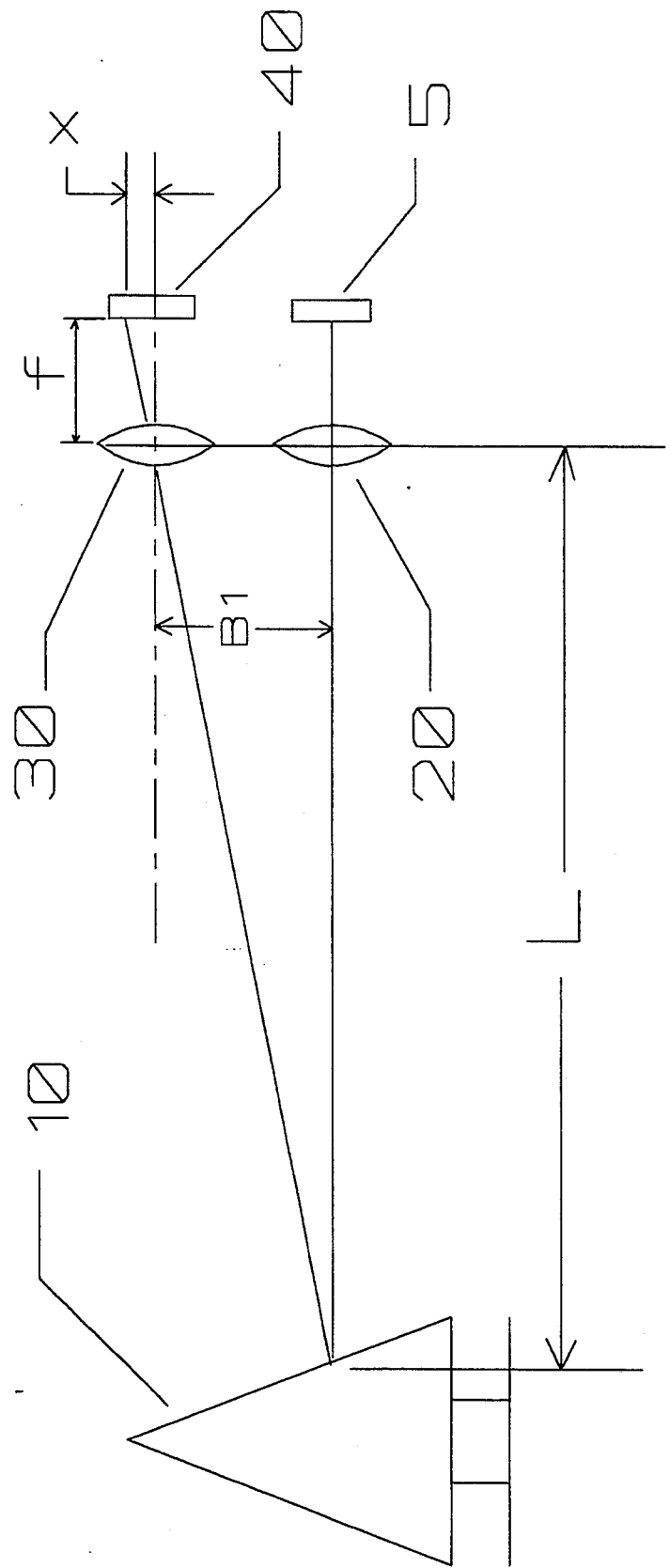

The present invention incorporates a minimum of the following three basic elements, each of which will be discussed in detail below:

(1) a range-measuring system with an optical baseline B1 containing a light emitting diode (LED), a position sensitive detector (PSD), and a signal processing circuit that computes the range;

(2) a range-measuring system with an optical baseline B2 which is different from B1 and which shares the same PSD and rangefinding circuit as in (1) but employs a second LED for the second baseline; and (3) a computer/microprocessor which keeps track of range measurements for both baselines B1 and B2, automatically switching between the two baselines as appropriate to the range measuring application.

To explain how the multiple-baseline optical system works, it is necessary to review how a single-baseline range-measuring system works. Because it is a representative application for the present invention, a single-baseline IR autofocus camera is chosen for description.

Three electronic components form the basis for the typical IR autofocus camera:

(a) an IR LED
(b) a PSD, and
(c) a signal processing circuit that computes the range to the object.

FIG. 1 illustrates the principle of measurement of the IR autofocus system. A pulse of IR light is emitted by LED 5, part of which is reflected off object 10 for which focus is desired. To increase the amount of light striking object 10, positive lens 20 is used to collimate the light from LED 5. A second positive lens 30 focuses the reflected light to a spot on PSD 40. It can be shown by geometry and basic optical principles that the distance L to object 10 is directly proportional both to the focal length of PSD lens 30 and to the spacing B1 (called the baseline) between LED 5 and PSD 40, and is inversely proportional to the distance x that the spot of light is displaced from the center of PSD 40. As shown in the figure, the formula for distance L to object 10 is:

$$L = (1/x) \cdot f \cdot B1 \quad (1)$$

The components that have been developed for IR autofocus cameras have been optimized for convenient lens focal lengths and baselines available on these cameras. For a given object distance, the displacement of the spot of reflected light on the PSD is fixed by the PSD lens focal length and the baseline. Typically, the focal length of the lenses used with the LED and the PSD have focal length of about 20 millimeters, and a baseline of about 30 millimeters is chosen.

With this range-measuring system, we can only compute a single set of focus zones, where each focus zone represents a fixed distance plus the small range of distances on either side of that fixed distance for which the camera lens when focused for that fixed distance remains acceptably focused for photographing an object located anywhere in that distance range. We have only the two variables f and B to set the focus zones where we want them to fall. With values for f and B of 20mm and 30 mm, respectively, the IR system incorporated by reference can divide a measurement range into 16 steps representing the distances shown in Table 1.

TABLE 1

| TYPICAL AUTOFOCUS CAMERA RANGE STEPS | |
|---|---|
| STEP | RANGE (meters, for sharpest focus) |
| 1 | 0.99 |
| 2 | 1.04 |
| 3 | 1.13 |
| 4 | 1.22 |
| 5 | 1.31 |
| 6 | 1.43 |
| 7 | 1.56 |
| 8 | 1.73 |
| 9 | 1.94 |
| 10 | 2.20 |
| 11 | 2.54 |
| 12 | 3.00 |
| 13 | 3.68 |
| 14 | 4.75 |
| 15 | 6.70 |
| 16 | 11.4 |

If we wish to move the point of closest focus to about ⅓ meter using the same electronic components, we can choose f=12 mm and B=16.67 mm for a different optical design, which gives the values shown in Table 2 for the range steps.

TABLE 2

| CLOSE FOCUS SYSTEM RANGE STEPS | |
|---|---|
| STEP | RANGE (meters, for sharpest focus) |
| 1 | 0.331 |
| 2 | 0.353 |
| 3 | 0.377 |
| 4 | 0.405 |
| 5 | 0.438 |
| 6 | 0.476 |
| 7 | 0.522 |
| 8 | 0.577 |
| 9 | 0.647 |
| 10 | 0.733 |
| 11 | 0.947 |
| 12 | 1.00 |
| 13 | 1.23 |
| 14 | 1.58 |
| 15 | 2.23 |
| 16 | 3.80 |

It is clear form comparison of these focus distance tables that the requirement to move the point of closest focus from 1 meter to ⅓ meter uses 12 of the 16 total available focus zones to provide for focusing in the near range of ⅓ meter to 1 meter. While this comes as no surprise (it is dictated by the laws of optics), it does mean that the focus of this optical design at distances greater than about 1.5 meters is somewhat 'soft', i.e., there will be noticeable loss in sharpness of focus at distances greater than 1.5 meters. This loss of sharp focus makes this system unacceptable for distance viewing by a human being wearing an autofocus telescopic visual aid or for distance focusing for an autofocus camera. A method to deal with the softness of focus in the intermediate to far distance range is to add a second optical design which uses a second, longer baseline B2, as shown in FIG. 2. By incorporating computer control, typically a microprocessor or microcontroller with appropriate support components, it is possible to automatically switch to the longer baseline B2 when reaching a specified step in the shorter baseline B1, and vice-versa. For example, the use of a second baseline which is exactly three times the short one (specifically, baselines of 16,67 mm and 50.0 mm) will allow switching at any step between the focus zones represented by the two tables above. For these specific baselines and optical components, a logical place to switch is where long baseline B2 picks up its closest focus zone, namely, switch to baseline B2 as soon as the short baseline B1 measurement passes zone 11.

The specifics of computer control of automatic switching between baselines is obvious to one with ordinary skill in the computer art. Representative details concerning programming and hardware design of such a computer system are described in *Embedded Controller Handbook*, 1987, Intel Corporation, Santa Clara, Calif. 95052, incorporated herein by reference.

It is an obvious extension to add a third and more baselines to further extend the total number of focus zones and thereby the total distance over which the subject invention is capable of measuring range with prespecified precision. Range measurements vary as a function of distance from very precise at very short distances to lesser but sufficient precision at all ranges as distance increases.

The electronic component method of choice for additional baseline(s) is to add an LED plus its collimating lens per additional baseline, as is shown in FIG. 2 for a two-baseline range-measuring system. The LED is typically the least expensive of the three electronic components for an IR range-measuring system, and its alignment with respect to its lens is not as critical as the lens-PSD alignment for equivalent performance.

Many changes and modifications in the above-described embodiments of the invention can, of course, be made without departing from the scope of the invention. Consequently, the scope is intended to be limited only by the claims following.

We claim:

1. A method for measuring range which employs multiple sets of similar triangles to effect range measurement over multiple ranges, in which each of the similar triangles in a pair is created with a collimated light source illuminating the object and a position-sensitive light detector receiving reflected light, with one said light source per triangle and a single said light detector common to the pair.

2. A method as in claim 1 which uses infrared light.

3. A method as in claim 1 which automatically focuses a wearable low-vision device.

4. A range measuring apparatus based on the principle of similar triangles which employs at least two of the combination of a light source and a first collimating lens defining a first optical axis, wherein each said source illuminates with a collimated beam the object whose range is to be measured, and wherein the reflection of light from said object from each source is collected by a position-sensitive light detector which may be shared by each said source and which is placed behind a second collimating lens defining a second optical axis and at the rear focal plane of said second lens, whereby each such illuminating, collimated beam and reflected beam form two sides of the first of a pair of said similar triangles, and the third side is formed by the distance between the centers of said first and second collimating lenses, said lenses being located in a common plane perpendicular to both said optical axes; two sides of the second of each pair of said similar triangles being formed by the focal length of said second collimating lens and the distance the reflected beam travels from said second lens before striking said position-sensitive detector, and the third side of said second triangle being the distance the reflected beam is deflected from said second optical axis, said apparatus thereby effecting more accurate range measurement over a given distance, effecting range measurement over a greater total distance, or effecting both greater accuracy and greater range measurement distance than an apparatus employing only one light source.

5. A range measuring apparatus as in claim 4 in which said light is infrared light.

6. A range measuring apparatus as in claim 4 which is incorporated in a wearable low-vision device to effect automatic focus of said device.

* * * * *